United States Patent [19]

Sangster

[11] 4,223,364
[45] Sep. 16, 1980

[54] PRESSURE AND TEMPERATURE RESPONSIVE PROTECTIVE DEVICES

[76] Inventor: Harold L. Sangster, Rte. #1, Box 55A, Shepherdstown, W. Va. 25443

[21] Appl. No.: 909,454

[22] Filed: May 25, 1978

Related U.S. Application Data

[63] Continuation-in-part of Ser. No. 826,648, Aug. 22, 1977, abandoned.

[51] Int. Cl.³ .................... H02H 5/06; H02H 5/08; H02H 7/04
[52] U.S. Cl. .................................. 361/37; 200/81.5; 361/103
[58] Field of Search ..................... 361/37, 41, 103; 200/81.5, 81 R, 83 C, 83 D, 153, SC; 337/298, 299, 300, 333, 342, 347, 348, 356, 385, 388

[56] References Cited

U.S. PATENT DOCUMENTS

| | | | |
|---|---|---|---|
| 2,223,530 | 12/1940 | Putman | 361/37 X |
| 2,273,540 | 2/1942 | Smith | 200/81.5 |
| 2,376,789 | 5/1945 | Leonard | 361/41 X |
| 2,389,373 | 11/1945 | Leonard | 200/81.5 |
| 2,817,794 | 12/1957 | Amundson | 361/37 |
| 3,445,726 | 5/1969 | Allen | 361/37 |

Primary Examiner—Harry E. Moose, Jr.
Attorney, Agent, or Firm—Howard L. Rose

[57] ABSTRACT

The dangers inherent in the failure of available sensors to protect against explosions of the tanks of oil filled transformers has been found to be due in part to failures of such sensors to compensate for the fact that the temperature-pressure relationship in tanks of oil filled transformers does not necessarily follow a single valued constant volume version of Boyle's Law. The construction of the apparatus is readily adaptable to pressure only or temperature only sensing, to contact make or break operation either inside or outside of the tank. Further difficulties arise particularly in stiff systems from failure of available protective systems to respond in a manner to prevent explosions in spite of a warning that conditions have reached the danger point. These dangers are further overcome by the use of a sensor which senses both temperture and pressure in the system to short circuit the high-voltage input conductor to the transformer to ground whereby a current limiting fuse or other overcurrent device is quickly opened thus causing the protective device immediately ahead of the transformer to clear the fault and prevent explosion of the transformer.

17 Claims, 10 Drawing Figures

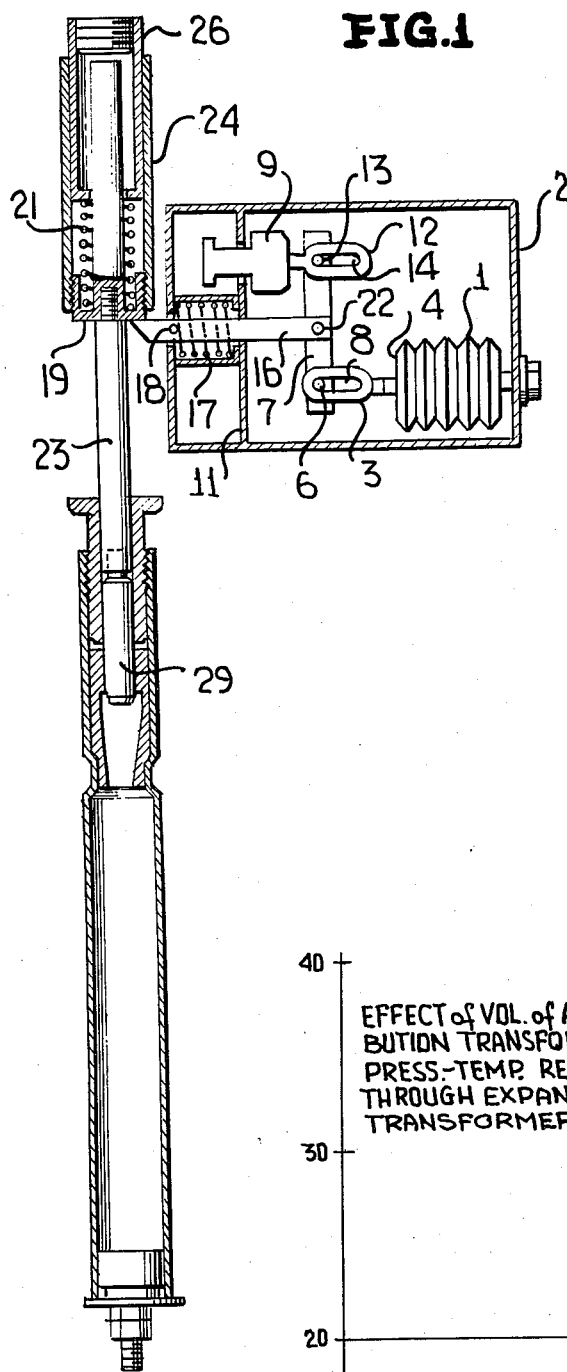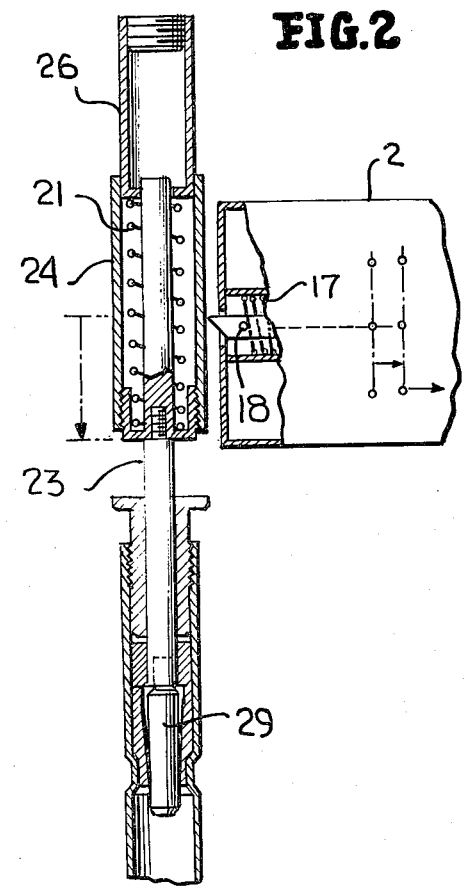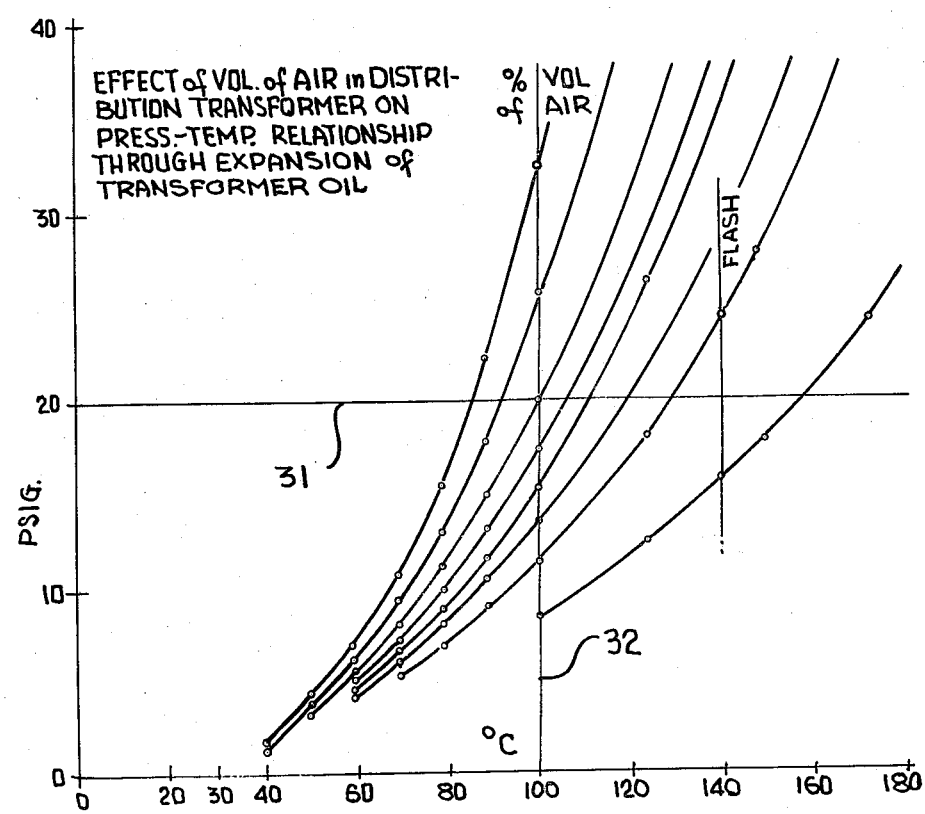

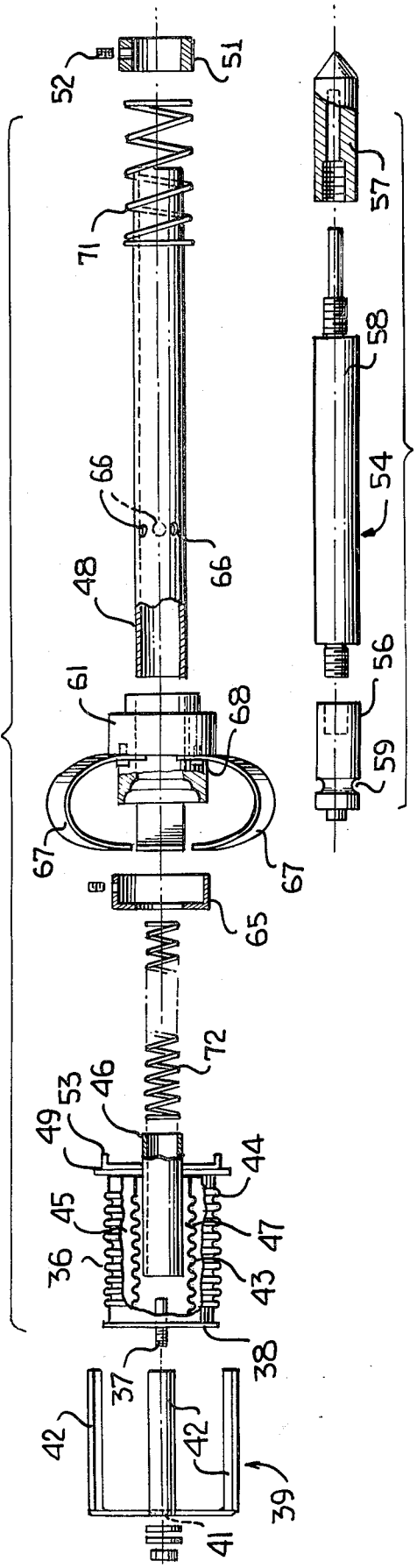
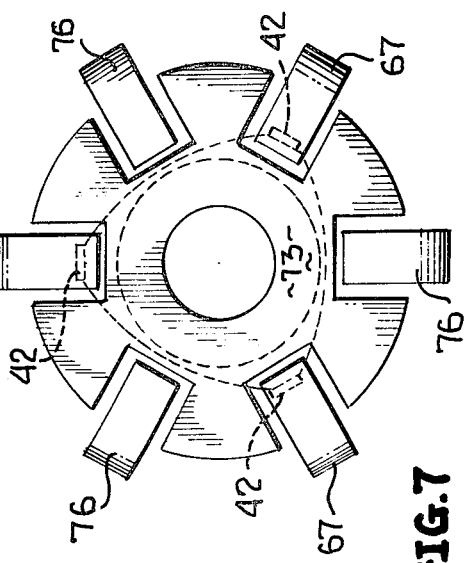
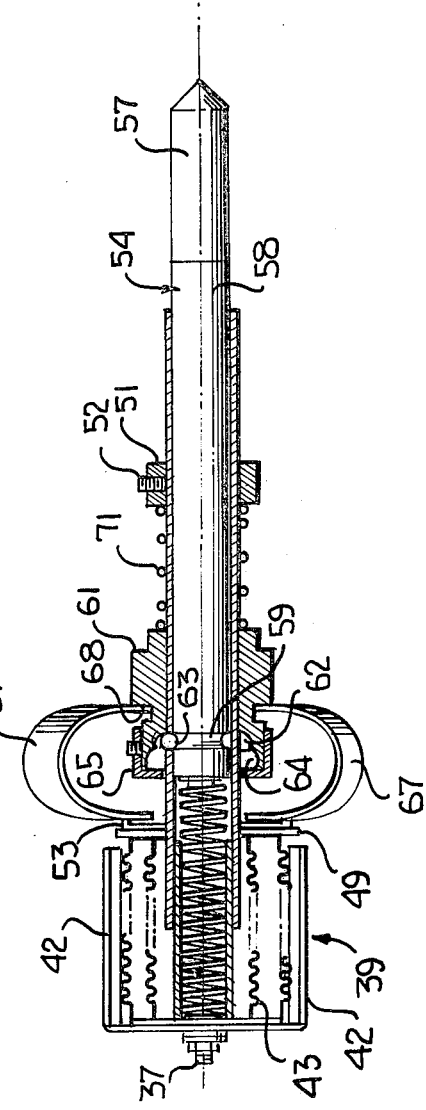

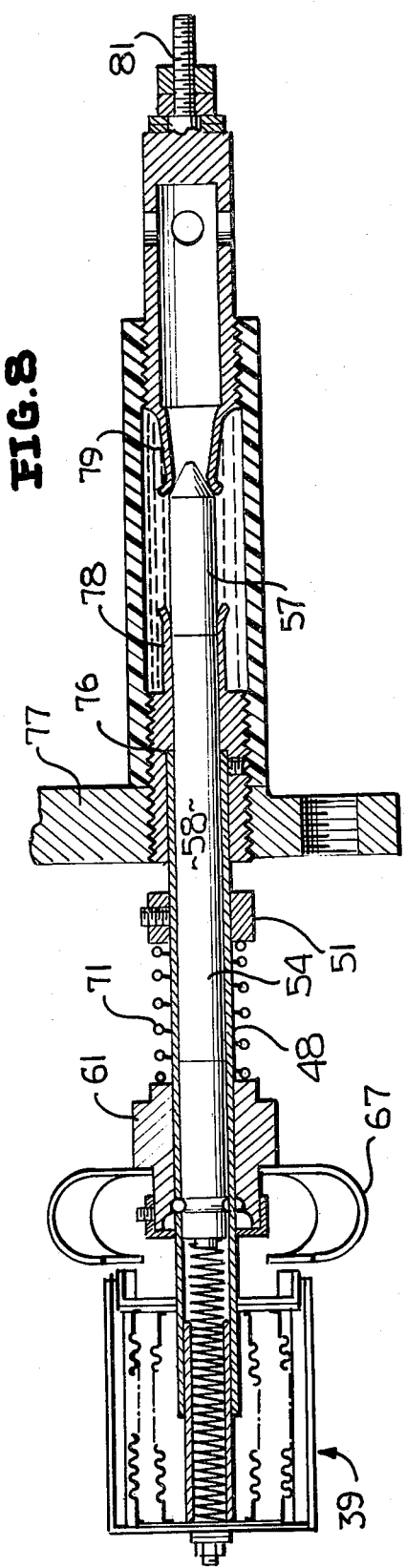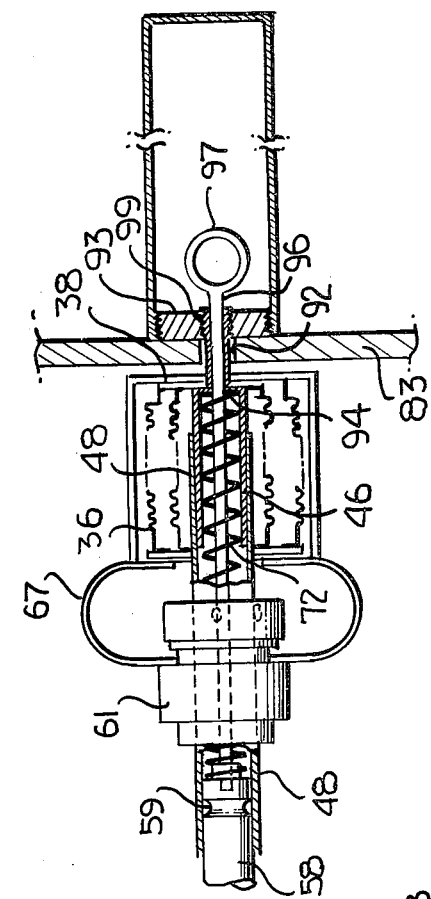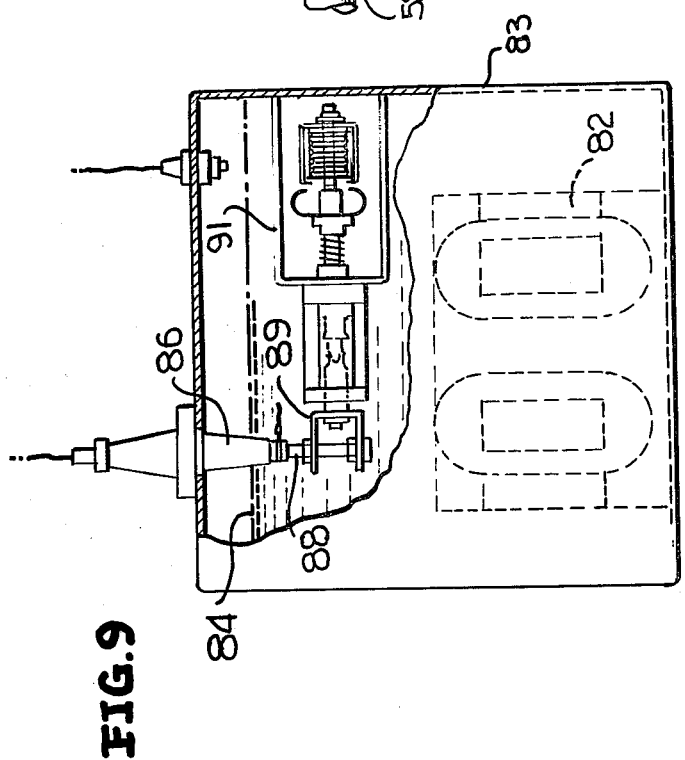

PRESSURE AND TEMPERATURE RESPONSIVE PROTECTIVE DEVICES

RELATED APPLICATION

The present application is a continuation-in-part of my copending application Ser. No. 826,648 filed Aug. 22, 1977, now abandoned, for Pressure and Temperature Responsive Protective Devices.

BACKGROUND OF THE INVENTION

The present invention relates to isolating devices for transformers or other electrical equipment and more particularly to temperature and pressure responsive protective devices for use with oil-filled transformers having associated therewith automatic pressure relief valves and current limiting fuses.

In the introduction to a paper presented by three Westinghouse engineers to the 1974 Electric Utility Engineering Conference in March 1974, it was stated:

"Increasing load densities have created a trend toward larger substations, often interconnected, and shorter distribution feeders. This has led to lower distribution system impedances and a corresponding increase in the power and energy which the systems can deliver to low-impedance faults. The result has been a definite increase in the number of catastrophic failures of distribution transformers. Since these failures can be hazardous to utility personnel and to the general public, they are of increasing concern to transformer manufacturers and users alike."

The nature of such catostrophic failures was described in the following terms:

"An electric arc rapidly dissipates energy into the surrounding medium. Arcs drawn in the oil in a transformer cause almost immediate decomposition of the surrounding oil into combustible and non-condensible gases (see Table I), and propagation of a shock wave through the remaining body of oil. With sufficiently great arc power and energy, the pressure wave and its reflections will cause disruption of the transformer's enclosure. Bushings or non-welded covers may be ejected. If the cover is welded on, or otherwise rigidly secured to the tank, the tank itself may rupture. Additional arcing may then occur above the oil surface, due to breakage of leads, grounding to the tank, or exposure of energized parts by reduced oil level. Since oxygen is then present, the combustible gas may ignite and set fire to the oil spray produced by the pressure wave, causing blazing oil to be ejected violently from the disrupted tank."

The prior art for years has attempted to deal with this problem but as is apparent from the 1974 presentation the problem persists and in fact as systems become stiffer the problem is intensifying.

The prior art has suggested the use of a temperature and pressure responsive sensor for and with oil filled transformers and reference is made to U.S. Pat. No. 2,273,450 to Smith. There are two basic problems with the reference: (1) the over temperature/or pressure sensor operates a relay to control some unspecified element in the transformer circuit and (2) there appears to be no realization of benefits from the device beyond redundancy, i.e. no realization that a constant volume Boyles Law does not apply in such installations.

It has been found that the relationship between temperature and pressure in a sealed oil-filled transformer tank is not governed completely by Boyle's Law but is a variable function of the relative percentages by volume of oil and air present in the tank. The oil-filled transformer tanks, the conventional percentages of oil and air are in the order of magnitude of 90% and 10%, respectively. If the aforesaid percentages are maintained, then a pressure relief valve designed to release at 20 psig will do so at a temperature of 100° C. However, either due to carelessness in initially filling the tank or in refilling the tank after maintenance or due to operation of an automatic pressure relief valve or to other factors, the above percentages may not be realized or maintained in which event the aforesaid pressure-temperature relationship is not valid.

Thus the need for the Smith device was not understood nor is the reason for its need recognized by the patentee. In addition the Smith device when placed in a transformer merely signals that a serious condition is building or actuates a relaying system and such is far from sufficient in present distribution systems.

The danger in present distribution systems is that due to short lines and high energy availability, the systems have a high fault energy availability, and in spite of the use of current limiting fuses, the amount of energy pumped into a fault before protective devices can take effect is often enough to destroy the transformer and in many cases produce an explosion. The fault energy (F) in MVA available is defined by $F = KV^2/Z$ where Z is the effective system impedance in ohms to the point of fault where KV is the line-to-line voltage. In present systems short heavy capacity lines and large capacity generators and transformers can pump 40,000 amps into a fault, more than sufficient to produce violent situations.

SUMMARY OF THE INVENTION

In accordance with the present invention, the aforesaid problems are overcome by employing a two-fold approach: (1) a protection system for sensing both over-temperature and over-pressure situations. and (2) transfer of the fault energy to a device specifically designed to dissipate the line fault energy under controlled conditions preferably to a point outside of the transformer casing.

As to the first aspect of the present invention it becomes apparent by subsequent reference to various figures of this application that a reduction of the volume of air to 8% rather than 10% results in a pressure of about 20 psig at 80° C. rather than 100° C. while the inclusion of 12% air produces a pressure of 20 psig at about 160° C. rather than 100° C. Thus, if only pressure is sensed the system reacts too early in the former example and too late in the latter example. If temperature sensing is employed the results are reversed.

The use of both temperature and pressure sensing thus serves the purpose of accomodating to inadvertent and often uncontrolled or uncontrollable variations in the oil-air ratio, and arc generated gases.

The present invention further contemplates location of the temperature sensing element in the upper level of oil, which except for "hot spots" at the point of insulation breakdown is the hottest region in the transformer, so that response is in advance of the Boyle's Law effect. Also, generation of gases by a slow high impedance internal fault produces a partial pressure effect enhancing the pressure variation, due to the air, and thus causes the pressure sensing function to be in advance of Boyle's Law temperature relationship.

The device of the present invention may readily be utilized because of the inclusion of the temperature sensing function, in conjunction with a pressure relief valve in the tank, set at, for instance, 7–10 psig. The valve will prevent operation of the pressure sensor, except in the situation when gas is generated at a rate that cannot be accomodated by the valve. The temperature sensor protects against over temperature, directly.

Another important feature of the invention is the ability to reset the sensor from externally of the tank. In the preferred embodiment of the invention the reset for the sensor is brought out through a wall of the tank and thus may be manually reset or in one alternative form of the sensor the high voltage circuit may be opened from outside of the tank. If the latter event the circuit may be opened before opening the tank preparatory to working in the interior thereof.

The pressure-temperature sensor of the invention functions in conjunction with the total system which includes a current limiting fuse or other current interrupting devices immediately preceeding the transformer.

Upon the sensor detecting conditions indicative of incipient fault, the high voltage input cable is shorted to ground thereby operating the overcurrent device and immediately terminating danger of explosion. In effect the total system operates to transfer the fault energy from the transformer which is not equipped to handle it to the current limiting fuse, expulsion fuse link cutout or other suitable current limiting device specifically designed to handle such fault energies.

It should be noted that the available fault energy set by the stiffness of the system determines the type of automatic circuit clearing protective device relied upon to act in case of fault. This applies to the design decision between current limiting fuses and lesser capability devices. It also applies to the option whether to use the system of this invention as a short circuiting or an opening device. If short circuiting is employed the selection of the current limiting device is a function of the current to be interrupted, a simple cutout up to 8000 amps, the addition of an expendable cap increases the rating of 16,000 amps, while current limiting fuses well in excess of 40,000 amps are available. Both full range and partial range current limiting fuses are available but the latter should be used in conjunction with a back-up device for the low ranges.

It is an object of the present invention to prevent explosions of oil filled transformer tanks by providing a sensor for early detection of a pressure and/or temperature rises which sensor causes grounding of the high voltage in the tank thereby forcing the current protective device located electrically immediately before the transformer to clear the fault thereby transferring dissipation of the fault energy from interiorly of the tank to a device located preferably externally thereof and which is specifically adapted for such purpose.

It is another object of the present invention to prevent explosion of oil filled transformer tanks by transferring dissipation of the fault energy to the circuit clearing protective device located electrically closest to and before the transformer to minimize the number of locations effected by an outage, which device is preferably a current limiting fuse.

It is still another object of the present invention to provide a novel pressure and temperature sensor for oil filled transformer tanks.

It is another object of the present invention to provide a pressure and temperature sensor transformer tanks that grounds the high voltage side of the input to the transformer and which may be reset from externally of the tank.

BRIEF DESCRIPTION OF THE DRAWINGS

These and other objects, advantages and features of the present invention will hereinafter appear in connection with the accompanying drawings, wherein:

FIG. 1 is a schematic view in elevation of a first embodiment of the present invention;

FIG. 2 is a partial view of FIG. 1 with the device triggered;

FIG. 3 is a graph illustrating temperature-pressure relationship at various percentages by volume of air and oil in an oil filled transformer tank;

FIG. 4 is an exploded schematic side view of another temperature-pressure sensitive device;

FIG. 5 is an exploded view of the movable electrodes of FIG. 4;

FIG. 6 is a side schematic view of the apparatus of FIG. 4 with the device in its cocked or unactuated condition;

FIG. 7 is a top schematic view of a modified form of the apparatus of FIG. 4;

FIG. 8 is a sectional view in elevation of one electrode structure of the apparatus of FIG. 4;

FIG. 9 is a combined electrical and mechanical schematic view illustrating the electrical fault clearing system in conjunction with the apparatus of FIG. 4 disposed in a transformer tank, and FIG. 10 is a detailed view of a recocking apparatus that may be employed with the apparatus of FIGS. 1 and 4 as applied to the tank of FIG. 9.

DESCRIPTION OF THE INVENTION

Referring specifically to FIG. 1 of the accompanying drawing there is illustrated a combined pressure and temperature sensor in accordance with one embodiment of the present invention.

The pressure sensor comprises a bellows 1 appropriately secured to housing 2. The bellows has a slotted arm 3 extending from the extensible and retractable end pin 4. A pin 6, extending outwardly from a cross-arm 7, is disposed in slot 8 in arm 3. The apparatus as now being described is intended to be mounted internally of the transformer tank so that as pressure in the transformer tank increases, the bellows 1 collapses and the arm 3 pulls to the right, as viewed in FIG. 1, on the arm 7 for purposes to become apparent.

A thermostat 9, of conventional design is appropriately secured to a frame member 11 and includes a slotted arm 12 extending to the right as viewed in FIG. 1. A pin 13, secured in the cross-arm 7, is seated in a slot 14 in arm 12 and moves cross-arm 7 to the right as temperature increases.

Cross-arm 7 is secured to a latch-arm 16 extending at right angle to and from the middle of arm 7. The member is spring biased to the left, as viewed in FIG. 1, by spring 17, which extends between housing member 11 and a pin 18 extending through the latch arm 16.

As described in greater detail subsequently, arm 16 extends under a member 19 biased downwardly, as viewed in FIG. 1, by a spring 21. Upon withdrawal of the latch-arm 16 from under member 19, member 19 is propelled downwardly by spring 21 and opens or closes a circuit as the case may be.

In operation, at normal operating temperatures and pressures, the apparatus is in the position illustrated in FIG. 1 with the arm 16 lying under member 19. Upon an increase in either temperature or pressure the arm 7 is moved to the right as viewed in FIG. 1, as is the arm 16. It will be noted that in the illustrated arrangement as a result of slots 8 and 14 in arms 3 and 12 respectively, the temperature and pressure functions are completely decoupled; i.e., each sensor operates independently of the other.

The temperature and pressure functions may be readily interrelated by pivotally coupling the arm 7 to arm 16 by pin 22, for instance. In such a case, movement of the arm 12 of the temperature sensor 9 to the right, and assuming pins 6 and 13 are equidistant from pin 22, the arm 16 is moved to the right by one-half the distance it would be moved if arms 7 and 16 were rigidly coupled and the pressure and temperature effects are cumulative.

If the same response to each parameter is desired in the latter case as in the former, then movement (sensitivity) of both the bellows and the thermostat would have to be double that in the apparatus employing rigid coupling of the arms 7 and 16. Various different sensitivities of responses to temperature and pressure may be achieved by changing the pivot point between arms 7 and 16 so that the length of the arm between pin 22 and 13 may be varied relative to the length of the arm between 22 and 6. Also, of course response may be varied by changing the compression force of spring 17 or in the case of pressure alone, by changing the compression force versus displacement function of the bellows. The apparatus may be rendered responsive to only one condition by simply removing one or the other of pins 6 and 13 and rigidly fixing 7 to 16.

Referring now specifically to FIGS. 1 and 2, the circuit making or breaking apparatus may comprise a spring biased rod 23 of insulating material secured to member 19. The member 19 comprises a sleeve 24 axially slidable along a hollow cylinder 26 having an outer diameter substantially the same as the inner diameter of sleeve 24. The lower end, as viewed in FIG. 2, of sleeve 24 is closed by the member 19 to which sleeve 24 is secured. A compression spring 27 extends between member 19 and end wall 28 of cylinder 26 and biases the rod 23 toward the position illustrated in FIG. 2.

The rod 23 carries at its lower end, as viewed in FIGS. 1 and 2, a conducting or insulating tip 29 which as explained in detail subsequently may make electrical contact to short circuit a line or open a circuit directly whichever is preferable in a particular situation.

The apparatus of FIGS. 1 and 2 may be wholly mounted in the transformer tank or only the housing 2 and its internally located components may be located in the transformer tank. In this latter event the arm 16 extends through the transformer tank through appropriate gland to interact with the contact making and breaking mechanism elements 21 through 29.

As previously indicated the present invention recognizes the variations from Boyle's Law introduced by changes in ratio of oil and air or other gas in the transformer tank. Referring now to FIG. 3 of the accompanying drawings, there is illustrated a series of graphs representing the relationships between pressure and temperature in a vessel for different relative percentages of oil and air volumes. It will be noted that at 10% by volume of air, which approximates the industry practice for oil filled transformer tanks, 100° C. corresponds to 20 psig. Thus, if it could be assumed that this ratio of air and oil were maintained, a single sensor, temperature or pressure, could be employed to protect against both overtemperature and overpressure. Reference to FIG. 3, however, indicates that even slight variations in the percentage by volume of air produces radical changes in the temperature-pressure relationship.

The flash point of oil is indicated on the graph and occurs at about 140° C. If for any reason the percentage of oil in the tank is reduced by as little as 8%, the flash point of oil is reached at 20 psig, a conventional pressure for actuation of pressure sensing circuit protection devices. Conversely if the air by volume is reduced to 8%, then a pressure sensitive device is actuated at a temperature of only 85° C.; not a dangerous situation but one that creates many unnecessary interruptions of service.

Conversely if a temperature sensor is employed, at 17% by volume of air, a dangerous situation is indicated at only 10 psig while at 8% air by volume a dangerous situation is not indicated until internal pressure has reached over 30 psig; not a very safe situation at best although tanks designed to withstand pressures as high as 50 psig may be specified. These high pressures, however, present a potential hazard particularly for repairman.

The changes from the desired condition of 10% air—90% oil are readily apparent by following lines 31 and 32 of FIG. 3, which illustrate that at 20 psig temperature varies from 85° C. at 8% air to 160° C. at 20% air and at 100° C. the pressure varies from approximately 8 psig at 20% air to above 30 psig at 8% air. It becomes apparent from reference to FIG. 3 that a single sensor, a temperature sensor or a pressure sensor, cannot protect a transformer tank or the transformer located therein from damage in the presence of variations of the percentage of air in the tank. Further, under no circumstances may a pressure sensitive sensor only, be utilized safely with an automatic pressure relief valve since such a valve completely destroys all relationship between temperature and pressure.

Referring now specifically to FIGS. 4–7, there is illustrated another embodiment of an apparatus for practicing the present invention. The apparatus comprises a bellows 36 having a bolt 37 secured to an end member 38 thereof and adapted to pass through hub 41 of a multi-finger spider 39; the illustrated device having three fingers 42 extending at right angles to said end member 38 and parallel to the axis of movement of the bellows 36.

The bellows 36 has inner and outer longitudinally extending cylindrical walls 43 and 44 defining therebetween a sealed annular space 45 at a prescribed pressure. A guide sleeve 46 extends axially through the central region 47 defined by inner wall 43 and is secured to end wall 38 of the bellows. An elongated hollow tube 48 is fitted over guide sleeve 46 and extends through an aperture in right end wall 49 of the bellows. The hollow tube 48 is the mechanical and electrical ground of the apparatus being secured to the tank of the transformer by a bracket, not illustrated in FIGS. 4–6, appropriately secured to a collar 51. The collar 51 is disposed about the tube 48 and is held in place by a set screw 52.

A shallow cup 53 with generally straight side walls is secured to end wall 49 of the bellows and to the hollow tube 48 at an appropriate location to be discussed subsequently. Thus the end wall 49 of the bellows 36 is secured to mechanical ground and the end wall 38 of the bellows is free to move relative thereto.

A rod 54 is slidably disposed in hollow tube 48 and corresponds generally with rod 23 of FIGS. 1 and 2. The rod 54, as illustrated more particularly in FIG. 5, comprises two end sections 56 and 57 and a central 58; the three sections being screwed together. Section 56 has an annular indentation 59 which cooperates with a latching mechanism to release the rod 54 upon occurrence of an over-pressure and/or over-temperature condition.

The latching mechanism comprises a sleeve 61 slidable along hollow tube 48. The sleeve 61 flares outwardly to provide an annular shoulder 62 to receive a plurality of balls 63, three balls in the device illustrated. The sleeve 61 flares outwardly from shoulder 62 to provide a second and larger shoulder 64.

The hollow tube 48 has three holes 66 lying in a plane perpendicular to its longitudinal axis, the holes lying at 120° relative to one another about the periphery of the tube. The diameter of the holes 66 is slightly less than the diameter of the balls 63, in order that balls remain captive in said holes when electrode latching element 59 has moved so as to longer cover said holes interiorly.

In the latched or cocked position of the rod 54, the sleeve 61 is located along hollow tube 48 with the shoulder 62 lying in the plane of the holes 66. Balls 63 are retained between shoulder 62 and the bottom of the annular indentation 59 in the rod, the balls 63 passing partially through apertures 66 in the tube 48. Upon movement of sleeve 61 to the right, as viewed in the figures, the balls may move outwardly only sufficiently to release the rod 54; balls still being seated in the apertures 66. The balls 63 are retained within the sleeve 61 by an end cap 65.

The mechanism for operating the latch in response to over temperature or pressure is now described. Three bimetallic elements 67, spaced about a circle at 120° spacings, are secured to surface 68 of sleeve 61. The bimetallic elements are generally arcuate with the ends remote from surface 68 extending under the shallow cup 53 but normally spaced therefrom or barely in contact therewith. Normally the three bimetallic elements are aligned each with one of the fingers 42 of the spider 39. Finally, the sleeve 61 is biased into the position illustrated in FIG. 6, by spring 71 extending between collar 51 and sleeve 61. The rod 54, when released, is propelled to the right by spring 72. The spring 72 extends between the end of the rod 54 and end wall of 38 of the bellows 36; being located within guide sleeve 46 and hollow tube 48.

In operation, upon an increase in temperature the free ends of the bimetals 67 extend toward the cup 53 and the fingers 42 of the spider. Upon contacting the fingers 42 and cup 53 and continued expansion, a force is exerted on the sleeve 61 and moves it against the force of spring 71; the force required to move the spider and therefore the bellows from a given position established by the chamber pressure being greater than that required to compress spring 71.

Upon sufficient movement of sleeve 61, the balls 63 are released and the rod 54 is propelled to the right, as viewed in the Figures.

In response to high pressure, the bellows is collapsed and the fingers 42 move to the right contacting bimetallic elements 67, to force them and the sleeve 61 to the right. As is believed to be apparent the system responds to both over-temperature and over-pressure concurrently and thus with both conditions proceeding simultaneously the system will trigger at some point less than 100° C. and 20 psig as determined by the mechanical arrangement and sizing of parts and stiffness of the springs. It should be noted that the compression force on the spring 71 and therefore the trigger temperature and/or pressure, may be varied by a change in position of the sleeve 51.

The device of FIGS. 4–6 responds to temperature only or temperature and pressure but not pressure alone. The apparatus may be readily modified to provide selective performance as a temperature only, a pressure only or a temperature and pressure responsive device. Specifically reference is made to FIGS. 4 and 7, a disc 73 replaces the cup 53 in FIG. 7. The disc 73 is rotatable about hollow tube 46 but may not move axially thereof. The disc 73 extends outwardly between metallic elements 67 and fingers 42 of the spider. More particularly, the disc 73 has a plurality of segments 74 extending radially at regularly spaced 60° intervals about its periphery with spaced openings 75 between the sections 74; the openings being spaced 60° apart on centers about the periphery of member 73. Metallic members 76 having the same shape as the bimetallic members 67, but not being thermal responsive, are disposed between the member 67 at equal angles therebetween and are secured to surface 68 of the sleeve 61.

When it is desired to render the device temperature responsive only the disc 73 is rotated so that segments 74 lie over, relative to the viewer of FIG. 7 the bimetallic elements 67 which now react against the disc 73 rather than fingers 42. The fingers 42 cannot act against the elements 67 and the pressure response is suppressed. If pressure only is to be sensed then the disc 73 may be located as indicated in FIG. 7 and the spider 39 is rotated so that fingers 42 are aligned with members 76. The pressure device now reacts on the latch via fingers 42 and members 76. If both temperature and pressure are to be sensed then fingers 42 are located over elements 67, as indicated by the dashed lines in FIG. 7, and the device operates as in FIG. 4.

The rod 54 and associated contact structures may take many forms and in one instance may be a modification of the system employed in the SBT Safe Break System of RTE's, or other compatible systems of the ESNA class.

A further modification utilized for grounding the transformer primary is illustrated in FIG. 8. In this arrangement an externally threaded sleeve 80 is appropriately secured to tube 48 on the side of collar 51 remote from the bellows. The sleeve 80 may be screwed into a mount 77 located interiorly of the transformer tank. The mount 77 is grounded but to avoid overheating or hazardous voltage gradients in the transformer tank an effective true electrical connection must be provided, of adequate conductivity paralleling the path through the tank to the high voltage base or bushing as the case may be where the systems neutral connection is made. The sleeve 80 terminates at the end remote from the latch of the apparatus, right end as viewed in FIG. 8, in an electrical contact 78 comprising an internally inwardly-tapered axially-extending region which snugly receives the metallic section 58 of the rod 54. Spaced by an appropriate distance from contact 78 is a second contact 79 which is provided with a high voltage bushing 81 at its right end. An external sleeve 82 of insulating material is threaded over the sleeve 80 and contact 79 is threaded into the sleeve 82.

In a grounding system, the member 57 is made of insulating material and the circuit operates normally. In the presence of high temperature or pressure, the rod is released and the conducting section 58 of the rod 54 bridges the contacts 78 and 79 grounds the high voltage to the system ground.

Conversely, if the system is to be utilized for circuit opening, the sleeve 80 is of non-conducting material or is insulated from the mount 77. Further the section 57 of the rod 54 is conductive and the section 58 is nonconductive. Normally high voltage is passed from contact 79 to contact 78 but in the presence of a fault, the nonconducting section 58 bridges the contacts and the circuit is broken.

Referring now specifically to FIG. 9 of the accompanying drawings, electrical fault clearing system and the arrangement of the transformer and the protective device within the transformer tank is illustrated. A transformer 82A is located within a tank 83 which is filled with oil to a level indicated by line 84. High voltage is supplied through a current limiting device 85 to a high voltage bushing 86 for bringing the high voltage through a wall of the tank. The tank may also have a system grounding bushing 87. The apparatus of FIG. 8 somewhat modified as explained below is located in the oil slightly below the upper surface 84 of the oil. The high voltage bushing 81 of FIG. 8 is connected to the high voltage terminal 88 via a support bracket 89. The mount 77 of FIG. 8 is a U-shaped bracket 91 of FIG. 9.

As indicated previously, the apparatus is located just below the upper surface 84 of the oil and thus senses the hottest region (other than local "hot spots") in the tank and thus advances the temperature sensing function ahead of the Boyle's Law relationship.

The operation of the system of FIG. 9 is such that upon sensing overtemperature and/or overpressure the rod 58 is released and is propelled at high velocity to the right as viewed in FIG. 8 whereby the high voltage terminal 88 is grounded to the tank 83 through rod 58 and bracket 91. The short circuit thus created causes the current limiting device 85 to rapidly open the circuit thus transferring the fault energy to the device 85 and protecting the transformer and tank and substantially reducing the danger of explosion.

It will be noted that the apparatus is direct acting; requiring no reliance on the power source since the energy stored in the spring 72 propels the rod 58. The current limiting device 85, such as a current limiting fuse operates, of course, from the line energy. Thus the entire system is self actuating and extremely fast since upon shorting of the transformer input cable the entire line energy of a stiff system is thrown across device 85.

As for the device 85 current limiting fuses or expulsion fuses or other types of current limiting devices may be employed depending on the fault energy to be cleared. The device 85 may be housed in a containment enclosure or completely in the open or in the case of lower energy systems in the transformer tank 83 although this latter arrangement is not preferred. If a partial range current limiting fuse is used it should be backed-up by a device that can safely clear low energy faults. In particular circumstances this latter arrangement is as effective but less expensive than a full range current limiting fuse. In either event the system of the invention insures that the necessary magnitude of fault current is applied across the device or devices 85 to invoke immediate operation of the device.

The device of FIG. 9 may be reset by opening the tank or utilizing an arrangement as set forth in FIG. 10. In this Figure, the guide sleeve 46 is not connected to the spider 42 but is necked down slightly and passes through an aperture 92 in the wall of the tank 83. The tube 46 threads into a nut 93 welded to the exterior of the tank. The spider 42 is secured to the surface 38 of the bellows 36; being apertured sufficiently to fit loosely around guide sleeve 46. Spring 72 is seated against a shoulder 94 provided by the reduced diameter of sleeve 46 before passing through the tank wall. A pull rod 96 passes through the guide sleeve 46 and is connected to the rod 54. An eye 97 is provided at the end of the rod 96 external to the tank 83 so that the rod may be pulled to reset the device after clearing of a fault. A housing 98 may be provided to cover the external end of rod 96 and a packing gland 99 is employed round rod 96 to prevent oil leakage from the tank.

The apparatus of FIG. 1 is readily adaptable to the mounting arrangement of FIG. 10 since a direct connection without modification of the apparatus may be made to the rod 23 thereof. Also the apparatus of FIG. 4 may be modified to cause contact opening or closing external to the tank by merely bringing the rod 54 out through bushing 99 and locating the contacts external to the tank.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A protection device comprising
   first sensor means producing a response to temperature which varies as a predetermined function of temperature,
   second sensor means producing a response to pressure which varies as a predeterminable function of pressure,
   a control means,
   means for setting said control means in a first control condition,
   said control means establishing a first electrical circuit condition when in said first control condition and establishing a second electrical circuit condition when in a second control condition,
   means for changing said control means from said first to said second condition upon detection of a predetermined condition,
   said condition being a function of the responses of said means for sensing over a continuous range from a minimum predetermined temperature and a maximum pressure to a minimum predetermined pressure to a maximum predetermined temperature.

2. The protection device of claim 1 wherein said means for changing includes an operating member,
   said operating member passing through a wall of said tank whereby to effect said change of electrical circuit condition exteriorly of said tank.

3. The protection device of claim 12 wherein said control means comprises,
   an operating member,
   said means for setting including means for retaining said operating member in a first position to establish said first electrical circuit condition, said means for changing including means biasing said operating member toward a second position and releasing said operating member to permit movement to said second position to establish said second electrical circuit condition.

4. The protection device of claim 3 wherein said protective device is mounted within a transformer tank, and
means located external to said tank for moving said operating member from its second position to its first position.

5. A protection device of claim 3 wherein said operating member is a rod,
said rod having conducting and nonconducting segments,
a pair of coaxial and spaced conductive sleeves,
said rod being slidably positioned within and in contact with said sleeves,
said segments of said rod being positioned such that in said first position of said operating member said conductive segment bridges said conductive sleeves.

6. A protection device of claim 3 wherein said operating member is a rod,
said rod having conducting and nonconducting segments,
a pair of coaxial and spaced conductive sleeves,
said rod being slidably positioned within and in contact with said sleeves,
said segments of said rod being positioned such that in said first position of said operating member said non-conductive segment bridges said conductive sleeves.

7. The protection device of claim 3 wherein said means for biasing comprises a spring.

8. The protection device of claim 1 or claim 3 further comprising
a tank partially filled with a fluid
means for mounting said first and second sensor in said tank generally immediately below the level of said fluid.

9. The protection device of claim 1 or claim 3 further comprising means for selectively disabling response of said means for changing to one of said sensor means.

10. A protection device of claim 1 or claim 3 further comprising
a closed tank,
a high voltage cable,
a transformer having a high voltage input terminal, and
an overcurrent circuit interrupting device disposed between said high voltage cable and said input terminal, and
an electrical ground,
said second circuit condition of said control means establishing a short circuit to ground of said high voltage applied to said input terminal.

11. A protection device of claim 10 wherein said circuit interrupting device is a full range current limiting fuse.

12. The protection device of claim 1 or 3 further comprising
a tank partially filled with liquid, and
means for subjecting said sensor means to the temperature of the liquid lying immediately below the upper surface of said liquid.

13. The protection device of claim 1 or 3 further comprising
a tank filled with liquid, and
means subjecting said sensor means to the pressure and temperature of the liquid lying immediately below the upper surface of said liquid.

14. The protection device of claim 1 or 3 further comprising
a tank,
an electrical cable extending into said tank,
a bushing supporting said cable
means supporting said protective device on said cable interiorly of said tank.

15. The protection device of claim 1 or 3 further comprising means for varying the response of said means for changing to said sensor means.

16. The protection device of claim 15 wherein said means for varying includes means for varying the response to said sensor means to different extents.

17. The protection device of claim 1 or 3 including means for rendering said means for changing independently responsive to each said sensor means.

* * * * *